(12) United States Patent
Sun et al.

(10) Patent No.: US 9,091,778 B2
(45) Date of Patent: Jul. 28, 2015

(54) EARTHQUAKE MONITORING DEVICE AND INSTALLATION METHOD THEREOF

(71) Applicant: KOREA INSTITUTE OF GEOSCIENCE & MINERAL RESOURCES, Daejeon (KR)

(72) Inventors: Chang-Guk Sun, Daejeon (KR); Geun-Young Kim, Seoul (KR); Chang-Soo Cho, Daejeon (KR); Jung-Ho Park, Daejeon (KR)

(73) Assignee: Korea Institute of Geoscience & Mineral Resources, Daejeon (KR)

( * ) Notice: Subject to any disclaimer, the term of this patent is extended or adjusted under 35 U.S.C. 154(b) by 252 days.

(21) Appl. No.: 13/787,732

(22) Filed: Mar. 6, 2013

(65) Prior Publication Data

US 2013/0258816 A1   Oct. 3, 2013

(30) Foreign Application Priority Data

Apr. 2, 2012 (KR) .................. 10-2012-0033952

(51) Int. Cl.
*G01V 1/16* (2006.01)
*G01V 1/00* (2006.01)

(52) U.S. Cl.
CPC .............. *G01V 1/166* (2013.01); *G01V 1/008* (2013.01)

(58) Field of Classification Search
CPC ....... G01V 1/008; G01V 1/166; G01V 1/181; G01H 17/00; G01H 1/00
USPC ................. 367/178, 188; 181/113, 121, 401; 340/689, 690; 73/649
See application file for complete search history.

(56) References Cited

U.S. PATENT DOCUMENTS

| | | | | | |
|---|---|---|---|---|---|
| 3,685,011 | A | * | 8/1972 | Lehner | 367/182 |
| 4,689,997 | A | * | 9/1987 | Windisch | 73/652 |
| 5,231,252 | A | * | 7/1993 | Sansone | 181/122 |
| 5,539,387 | A | * | 7/1996 | Gitlis et al. | 340/690 |
| 5,920,524 | A | * | 7/1999 | Stein et al. | 367/188 |
| 5,978,317 | A | * | 11/1999 | Whitener | 367/178 |
| 6,119,804 | A | | 9/2000 | Owen | |

OTHER PUBLICATIONS

Mori, M., et. al., "Influence of Sesimometer Foundation Adjacent Building and Surface Ground Condition on Strong Motion Records," 14th World Conference on Earthquake Engineering, Beijing, China, Oct. 12-17, 2008, (8 pgs.).

* cited by examiner

*Primary Examiner* — Ian J Lobo
(74) *Attorney, Agent, or Firm* — Christensen Fonder P.A.

(57) ABSTRACT

Disclosed are an earthquake monitoring device and a method of installing the same, which can permit stable and efficient installation and operation on any ground surface with free-field conditions including level and sloped ground conditions, and can provide precise monitoring results of earthquakes. The earthquake monitoring device includes a sensor for sensing vibration; and a base having an upper surface formed into a leveled surface, wherein the sensor is secured to the upper surface, and the base is placed on an excavated ground such that the upper surface of the base is positioned on a ground surface or the sensor on the upper surface of the base intersects the ground surface.

12 Claims, 6 Drawing Sheets

EARTHQUAKE MONITORING DEVICE AND INSTALLATION METHOD THEREOF

BACKGROUND OF THE INVENTION

1. Field of the Invention

The present invention relates to an earthquake monitoring device and a method of installing the same, and more particularly, to an earthquake monitoring device and a method of installing the same, which can permit stable and efficient installation and operation on any ground surface with free-field conditions including level and sloped ground conditions, and can provide precise monitoring results of earthquakes.

2. Description of the Related Art

Recently, as earthquakes frequently cause catastrophic damage, social concern over earthquakes is gradually increasing. For the purpose of early warning and rapid response to earthquakes, earthquake monitoring for major sites and facilities has been rapidly expanded to apply various options and obtain data.

Such earthquake monitoring is performed to measure velocity or acceleration as major monitoring targets at a monitoring location upon an earthquake. Earthquake monitoring using a seismometer is essentially intended to investigate quantitative phenomena of an earthquake and thus is also classified as seismic observation. Most seismometers are operated at a location generating very insignificant noise, if any, and are thus placed in bedrock located at a deep depth or in desolate mountains and tunnels. Unlike seismometers, accelerometers are relatively cheap and serve to monitor an earthquake under living conditions. Thus, the accelerometers have been broadly placed on major facilities or surrounding sites.

Generally, recent earthquake monitoring instruments can be classified into a sensor for detecting vibration signals such as in an earthquake and a recorder for recording such signals. In recent years, a data transmission apparatus based on wired and wireless communication techniques may be additionally connected to the earthquake monitoring instruments, or a data transmission function may be incorporated into the recorder. The sensor which initially senses seismic signals from outside is provided therein with a vibration measurement device designed to monitor an earthquake in terms of three components on the orthogonal coordinate, in which the three components include a longitudinal component, a transverse component, and a vertical component. Generally, the sensor is placed such that these components collide with the north-south direction, the east-west direction, and the direction of gravity, respectively. The sensor typically has a circular shape in plan view and can be made in a substantially quadrangular shape or various other shapes.

Earthquake monitoring can provide data for earthquake alert and response and can also be utilized as a fundamental resource for earthquake-resistant design based on accumulation of such data and establishment of databases. Therefore, monitoring reliability in various fields can be ensured based on reliable installation and operation. In addition, since the seismometers and accelerometers are very expensive as compared with other measuring devices and must be operated for a long time once installed, they must be appropriately placed to provide reasonable data so as to ensure economic feasibility.

Nevertheless, inadequate installation and operation of such monitoring devices are made on many monitoring target locations, causing serious economic loss and use of erroneous earthquake monitoring data. For an earthquake monitoring device, many sensors are inadequately installed or operated. Generally, instead of being directly exposed to an external environment, the recorder is placed and operated in a stable indoor environment and is made in a standard form, and thus incorrect installation and operation of the recorder hardly occurs. However, although sensors are used together with a variety type of accessories or through partial modification of monitoring locations when placed at a site or facility to be monitored, thereby requiring high technical knowledge, the sensors are generally installed by unskilled laborers, causing critical mistakes. Therefore, there is an urgent need for a systematic technology associated with installation and operation of the earthquake monitoring sensor in order to prevent serious mistakes in installation and operation and to provide reliable earthquake monitoring data such that efficient earthquake alert and response and reasonable earthquake-resistant designs can be obtained. In addition, since many earthquake monitoring sensors are directly exposed to natural environments, there is a need for environmentally friendly installation thereof.

In general, the earthquake monitoring sensors are placed at various locations, such as ground surfaces, or surfaces of elements or members inside or outside facilities, so as to be exposed to an atmosphere (i.e., air) in a natural state and to have verticality through base work and level adjustment by taking azimuths into account. Exceptionally, when earthquake monitoring is performed through a borehole which entails enormous cost, the sensor does not have a free-field which allows the sensor to contact the atmosphere. In this case, since experts in the field of seismology or earthquake engineering generally participate in planning, installation and operation for such earthquake monitoring, there is substantially no error in obtaining data.

On the contrary, earthquake monitoring using sensors installed in a free-field are relatively inexpensive and commonly used. Accordingly, this type of sensor is generally accepted in the art and thus is frequently installed by unskilled persons instead of experts in seismology or earthquake engineering, thereby causing mistakes in installation and operation.

A typical serious mistake frequently occurring in free-field earthquake monitoring is that earthquake monitoring is performed with respect to different locations or conditions providing significantly different seismic response instead of being performed with respect to a monitoring target location to be considered in practice.

As shown in FIG. 1 which is a diagram illustrating typical mistake cases, although earthquake monitoring data associated with free-field ground surfaces of the ground are demanded as impotent data to be used in the field of seismology or earthquake engineering, earthquake monitoring is performed on completely different locations or conditions caused by excavation or additional concrete support, and the resultant data are used as desired data measured on the ground surface. If data measured according to FIG. 1 are used for earthquake-resistant design or earthquake-resistant performance evaluation, seriously underrated or overrated designs and evaluation can be incurred. In addition, as partially shown in FIG. 1, a protective device or base for the earthquake monitoring sensor is neither considered nor employed. As a result, frequent failure and reduction in lifespan of the earthquake monitoring sensor and errors in measurement data in combination with external factors can be incurred.

SUMMARY OF THE INVENTION

The present invention has been made in view of the above problems and is aimed at providing an earthquake monitoring device and a method of installing the same, which can permit stable and efficient installation and operation on any ground surface with free-field conditions including level and sloped ground conditions, and can provide precise monitoring results of earthquakes.

In accordance with one aspect of the present invention, an earthquake monitoring device includes: a sensor for sensing vibration; and a base having an upper surface formed into a level surface, wherein the sensor is secured to the upper surface, and the base is placed on excavated ground such that the upper surface of the base is positioned on a ground surface or the sensor on the upper surface of the base intersects the ground surface.

The earthquake monitoring device may further include: a plurality of shallow piles each having an upper portion inserted into and secured to a lower portion of the base and protruding from the lower portion of the base in a direction of gravity.

The earthquake monitoring device may further include a plurality of sockets each coupled to a lower portion of each of the shallow piles; and a plurality of deep piles each having an upper portion coupled to the socket and protruding from the lower portion of each of the shallow piles.

The earthquake monitoring device may further include a plurality of guide bars coupled to side surfaces of the sockets to connect the sockets with each other in a lateral direction.

The earthquake monitoring device may further include a housing placed on the upper portion of the base to accommodate the sensor therein.

The base may have a thickness 1 to 2 times the thickness of the sensor, and a distance between an edge of the sensor and an edge of the base is 1 to 1.5 times the diameter of the sensor.

The base may include one material selected from among concrete, reinforced concrete, soil-cement, timber, rubber, plastic, and rock.

The base may have a bottom surface with high roughness.

The upper surface of the base may be formed at a central region thereof with a sensor anchor securing portion having a groove shape to fix the sensor through an anchor.

The shallow piles may be made of steel or aluminum.

The shallow piles may have a length corresponding to a thickness of the base.

The housing may be provided at an upper side thereof with a lid capable of being rotated open or closed, and at a side surface thereof with a flexible tube connecting cables.

In accordance with another aspect of the present invention, a method of installing an earthquake monitoring device includes: excavating original ground; placing a base on the excavated ground such that an upper surface of the base is positioned on a ground surface or a sensor on the upper surface of the base intersects the ground surface; backfilling the excavated ground; and fixing a sensor for sensing vibration to a sensor location on the upper surface of the base.

Shallow piles may be inserted into and secured to a lower portion of the base to protrude from the lower portion of the base in a direction of gravity, and installing the base may include penetrating the shallow piles into the excavated ground in a push-in manner, or inserting the shallow piles into holes which are drilled in the ground and filling the holes with a filler material.

The shallow piles may be inserted into and secured to a lower portion of the base to protrude from the lower portion of the base in a direction of gravity, and installing the base may include vertically positioning deep piles by penetrating the deep piles into the excavated ground in a push-in manner, or inserting the deep piles into holes which are drilled in the ground and filling the holes with a filler material; coupling sockets on upper portions of the deep piles; coupling guide bars to side surfaces of the sockets to connect the sockets with each other; and coupling upper portions of the sockets to lower portions of the shallow piles.

A housing may be placed on the upper portion of the base to accommodate the sensor before or after fixing the sensor.

BRIEF DESCRIPTION OF THE DRAWINGS

The above and other aspects, features and advantages of the invention will become apparent with reference to the following exemplary embodiments in conjunction with the accompanying drawings, in which.

DETAILED DESCRIPTION OF THE EXEMPLARY EMBODIMENTS

Figure 1:
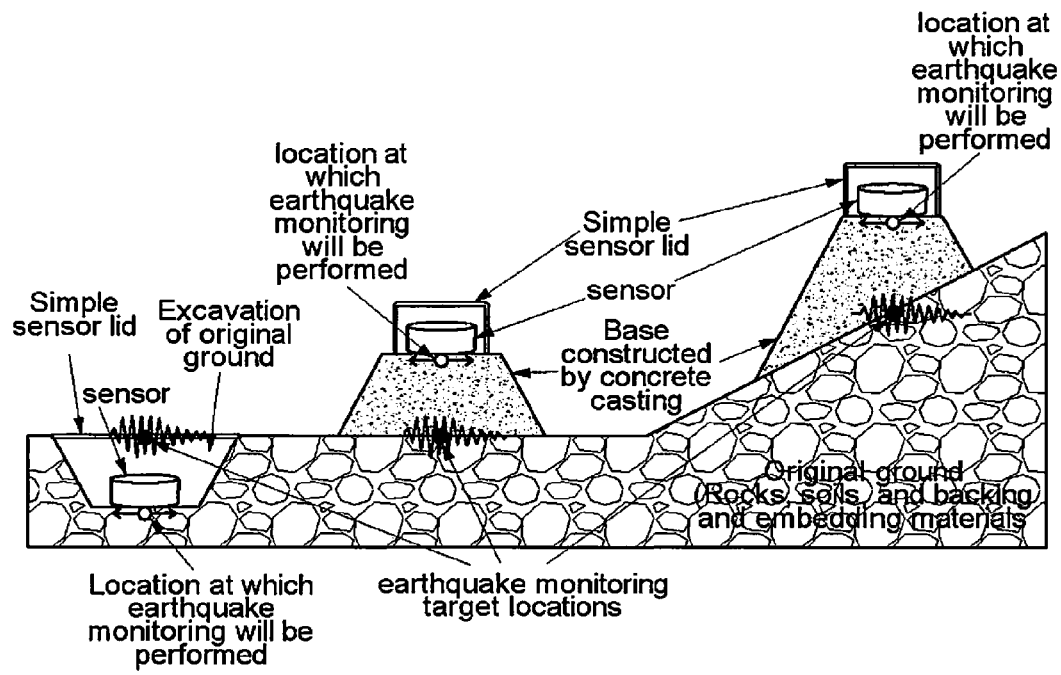
FIG. 1 is a diagram showing mistakes in installing and operating an earthquake monitoring device in the related art.

Exemplary embodiments of the present invention will now be described in detail with reference to the accompanying drawings.

According to the present invention, as monitoring target locations, free-field ground surfaces including a substantially level ground condition or a sloped ground condition can be firstly considered, and conceptually, surfaces in interior spaces of buildings or surfaces of underground structures may be considered. An earthquake monitoring sensor must be precisely geometrically placed before processing of various field conditions, and also be placed at a location after various elements or devices provided to allow the sensor to be stably and reliably operated are employed.

The location of the sensor as shown in drawings is a location which has been used as a free-field surface of original ground before various artificial works are applied. Accordingly, disclosed herein are technologies having various complex meaning for satisfactorily performing earthquake monitoring at such a monitoring target location.

A free-field earthquake monitoring sensor is reasonably installed at a target location on the original ground which is not worked, but such a reasonable condition can be undesirably hindered by various environmental changes and the like. Therefore, to adequately place and operate the earthquake monitoring sensor in practice, the underlying potion contacting the sensor needs to undergo less alteration or deformation by external factors, such as weathering, erosion and the like, for a much longer time than lifespan of the sensor. By setting up such a site environment, earthquake monitoring data which are stably and continuously obtained on the same location may be reasonably used. The site environment established in such a manner allows utilization of monitored data at the same location for several decades by replacing only the earthquake monitoring sensor, whereby continuous data obtained under the same conditions for a long time can be provided to experts in earthquake engineering and used as very useful data.

Hereinafter, an earthquake monitoring device and a method of installing the same according to exemplary embodiments of the present invention will be described in detail with reference to FIGS. 1 to 4.

The earthquake monitoring device according to one exemplary embodiment of the present invention includes a sensor 10 for sensing vibration, a base 20 placed on an excavated ground and configured to allow the sensor 10 to be secured to an upper portion thereof, a housing 30 placed on the upper portion of the base 10 to accommodate the sensor 10, shallow piles 40 each having an upper portion inserted into and secured to a lower portion of the base 20 and protruding from the lower portion of the base 20 in the direction of gravity, sockets 50 each coupled to a lower portion of each of the shallow piles 40, deep piles 60 each having an upper portion coupled to the socket 50 and protruding from the lower portion of each of the shallow piles 40, and guide bars 70 coupled to side surfaces of the sockets 50 to connect the sockets 50 to each other in a lateral direction.

The earthquake monitoring device according to the embodiment of the invention may be basically constituted by the base 20 and the sensor 10 secured to the upper portion thereof. However, depending on ground conditions, the earthquake monitoring device may further include the shallow piles 40 inserted into and secured to the lower portion of the base 20, and may further include the deep piles 60 and the guide bars 70 connected by the sockets 50. These embodiments will be described below.

First, the base 20 has a level upper surface on which the sensor is securely mounted. The base 20 is buried in an excavated portion of the original ground such that the upper surface of the base is placed on the ground surface (e.g., on level or gently sloped ground), or the sensor on the upper surface of the base intersects the ground surface (e.g., on sloped ground).

To establish a site environment, a portion of the original ground contacting the sensor is excavated and an additional substitution material or structure such as the base 20 is then placed therein as shown in the figure. According to the present invention, instead of being constructed by concrete casting on site, the base may be realized as a pre-cast base, which is previously manufactured in consideration of a desired sensor and site conditions to be easily used on site by unskilled laborers. The base 20 may have a thickness 1 to 2 times the thickness (height) of the sensor 10 in consideration of the weight of the sensor 10, ground conditions, portability, minimum stiffness, and the like. In addition, for the sensor having a circular shape in plan view, a distance between an edge of the sensor 10 and an edge of the base 20 closest to the edge of the sensor 10 may be 1 to 1.5 times the diameter of the sensor 10 in consideration of a side space for maintenance of the sensor in the housing 30 and manufacturing costs. For the sensor having a quadrangular shape or other shapes, the diameter of the sensor may be calculated based on an equivalent circular shape thereof. The base 20 may have various cross-sectional shapes, such as a circular cross-sectional shape or a regular octagonal cross-sectional shape, in addition to a square cross-sectional shape as shown in the drawings.

The base 20 may be formed of various materials depending on the condition of the original ground. When the base 20 comprises a material having stiffness or softness excessively different from those of the ground, earthquake data can be significantly different from that obtained from the ground. Accordingly, when the original ground is rock, the base 20 formed of concrete or reinforced concrete may be employed, and when the original ground is soil, the base 20 may be made of soil-cement, timber, rubber, plastic or the like in consideration of use or conditions of an associated site. Nevertheless, when the original ground is a very intact rock without joint or fractures in a region on a flat surface used for the sensor 10, leveling of the original ground may be performed to use the original ground as the base 20, instead of using the pre-cast base 20. In this case, while minimizing excavation operation for leveling, use of a cement paste or other adhesives for constructing a base foundation must be avoided, if possible, since a separation between such an additional material and the original ground can occur over time.

The upper surface of the base 20 may be manufactured in a smooth level state, and the bottom surface may be roughened to a high roughness such that the base 20 may be integrated with backfill materials supplied after excavation, or may have increased friction.

When the original ground is not hard rock but severely weathered rock or soil, the base 20 may be manufactured in a state that additional shallow piles 40 are partially inserted into and secured to the base to protrude from the bottom surface of the base in the direction of gravity in order to ensure performance against external factors over time, enhancement of bearing capacity of the ground, behavior with the original ground, and the like.

As the shallow piles 40, deformed steel bars may be used to increase a specific surface area in order to enhance friction to the original ground and the backfill materials, and for soft soil ground, aluminum bars may be used instead of steel bars although aluminum is more expensive than steel. Basically, the pre-cast base 20 further includes the shallow piles 40 protruding a length corresponding to the thickness of the base (i.e., 1 to 2 times the thickness of the sensor) to be used for rocks other than hard rocks. Such a configuration corresponds to a size capable of providing simplicity in pre-casting and transportation, and is classified as a shallow pile foundation with regard to the shallow piles 40 having such a length.

Figure 2:
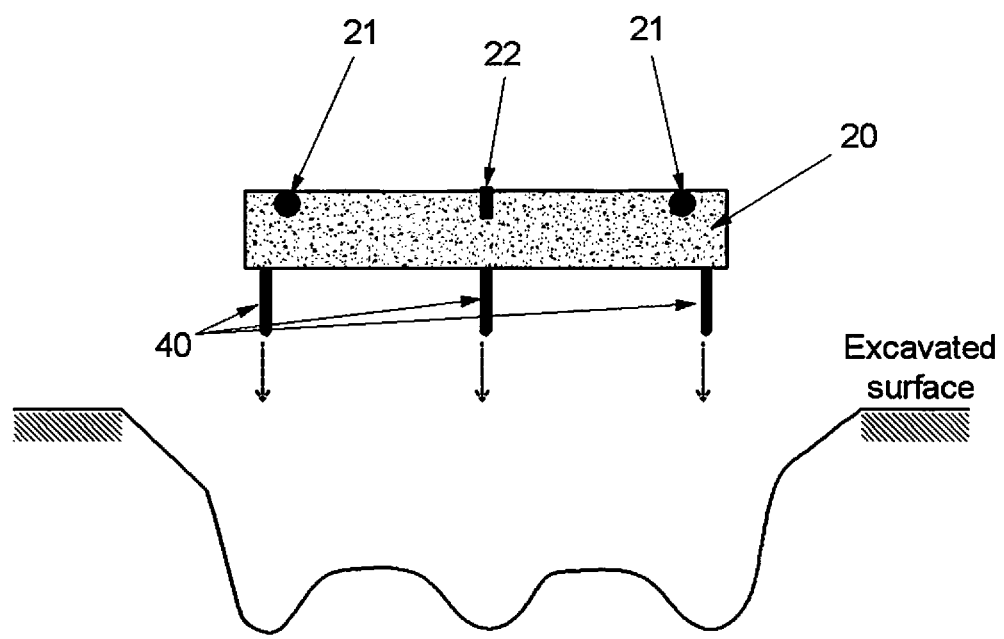
FIG. 2 is a view of a base and piles for constructing a shallow pile foundation for an earthquake monitoring device according to one embodiment of the present invention.

For fractured rocks or weathered rocks, as shown in FIG. 2, excavation of the ground is performed to provide an excavated surface on which the shallow pile foundation is constructed, the pre-cast base 20 including the shallow piles 40 is placed on the excavated ground, and then backfilling is performed using a concrete material or a soil-cement material while adjusting the upper surface of the base 20 to an elevation of the ground before excavation. However, since lower ends of protruding steel bars of the shallow piles 40 on the bottom surface of the base may be placed deeper than the excavated surface for installation of the shallow piles 40, the steel bars of the shallow piles 40 may be penetrated into the excavated ground at steel bar holding locations in a push-in manner, or otherwise, when such penetration is difficult, the steel bars may be inserted into pre-drilled holes and then the holes may be filled with cement paste, thereby constructing the base 20.

For soils softer than weathered rock, the piles may have an increased length to ensure minimized deformation or to enhance bearing capacity of the associated ground in order to obtain a stable monitoring environment. However, since mobility of components associated with the base 20 is also an important issue together with simplicity in manufacture of the components, the deep piles 60, having a longer length for deep pile foundation, may be applied to the base 20, instead of being inserted into the base 20 during pre-casting of the base 20. Specifically, the sockets 50 are provided to the base 20 including the shallow piles 40 to connect the lower ends of the shallow piles 40, which are steel bars for shallow pile foundation, to the deep piles 60, which are steel bars (i.e., metal bars) for the deep pile foundation and may have various lengths.

In this case, the lower ends of the shallow piles 40 and the upper ends of the deep piles 60 are each formed as a protruding tapered screw bolt, and the sockets 50 have upper and lower portions each formed as a tapered screw nut to receive opposite ends of both piles.

Figure 3:
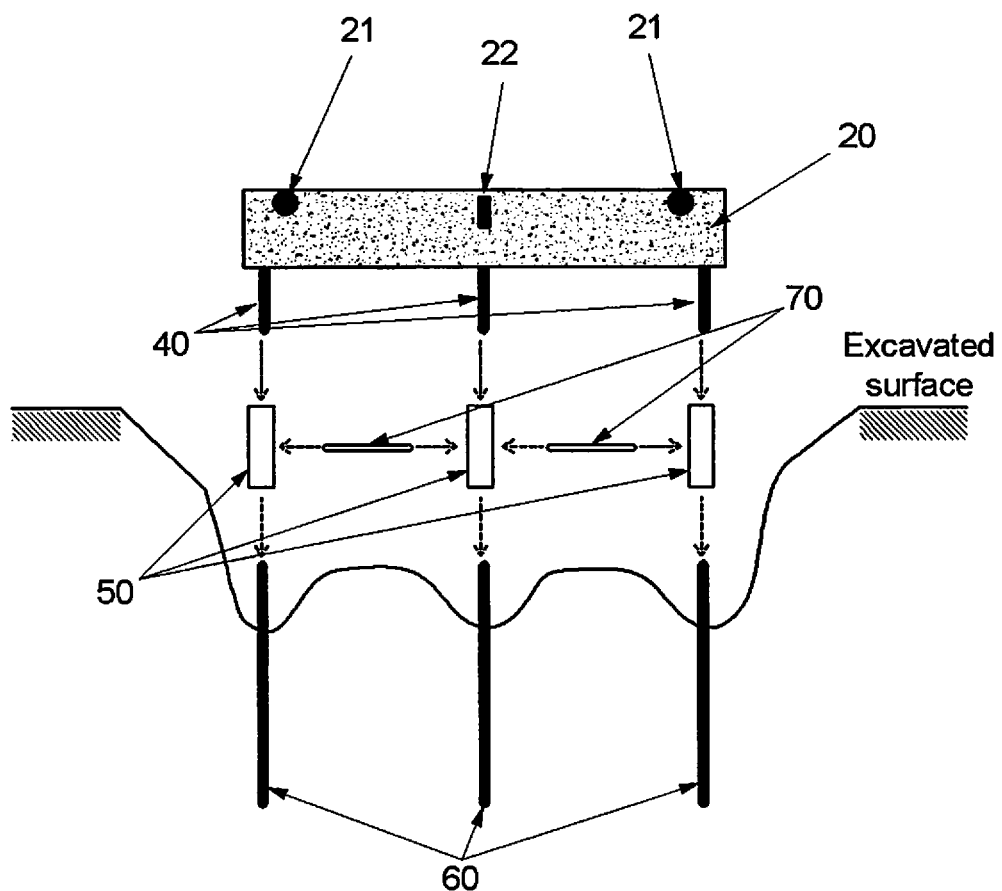
FIG. 3 is a view of a base and piles for constructing a deep pile foundation for the earthquake monitoring device according to the embodiment of the present invention.
Figure 4:
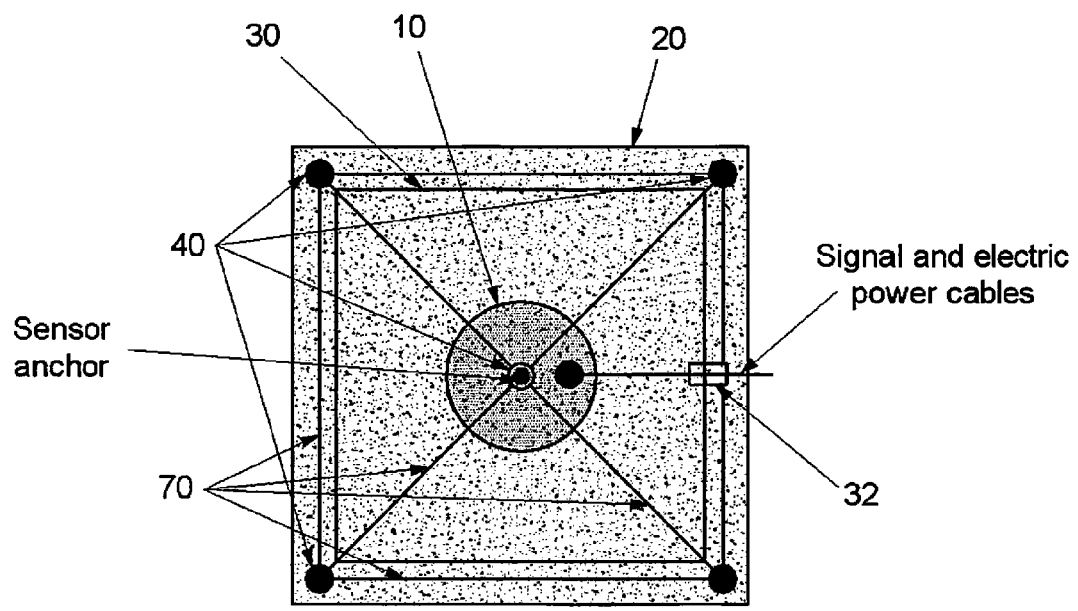
FIG. 4 is a diagram of the earthquake monitoring device according to the embodiment of the present invention.

In addition, the middle portion between the upper and lower portions of the sockets 50 is configured to provide a clearance, and is formed with screw nut receiving portions on side surfaces thereof at intervals of 90 degrees or 45 degrees in a circumferential direction as in a plane arrangement of FIG. 4. Thus, as shown in FIGS. 3 and 4, the horizontal guide bars 70 having screw bolts formed on ends thereof may be connected to the screw nut receiving portions.

The horizontal guide bars 70 serve to prevent deterioration of verticality with increasing length of the foundation steel bars, unlike the shallow piles 40, or to enhance lateral resistance, which is a structural limitation of the pile foundation.

Figure 5:
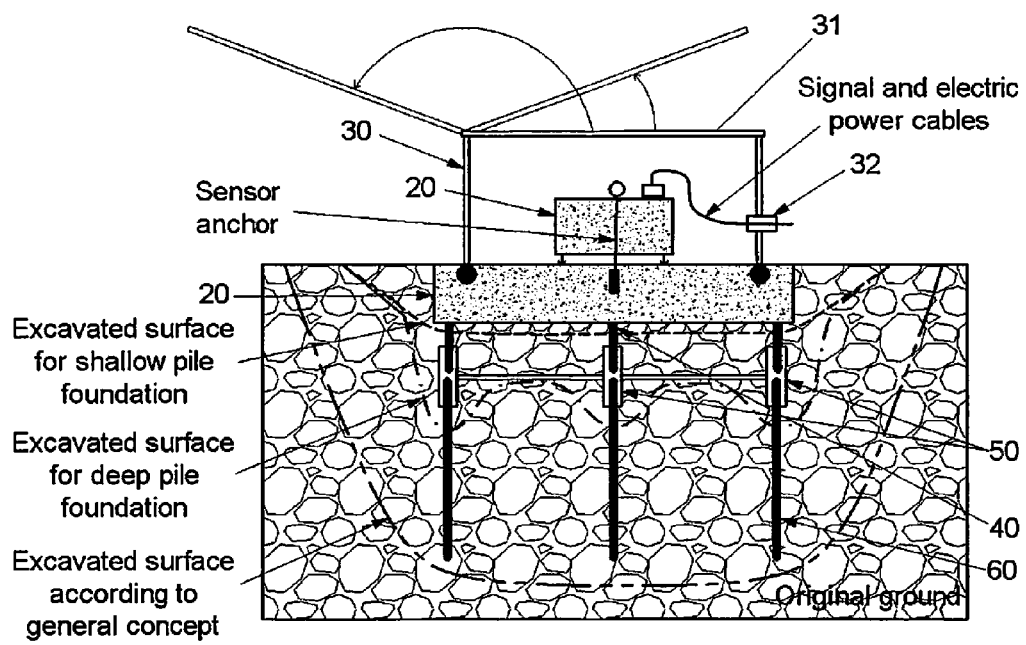
FIG. 5 is a view of a method of installing an earthquake monitoring device according to one embodiment of the present invention.

In order to achieve satisfactory and efficient construction and application of the base including the deep piles 60, the ground is first excavated to provide an excavated surface for construction of the deep pile foundation, as shown FIGS. 3 and 5. Then, the deep piles 60 (i.e. steel bars) are penetrated into the excavated surface in a push-in manner at locations on which the pile foundation will be placed. If necessary, such steel bars may vertically extend to a predetermined depth by disposing the steel bars in pre-drilled holes and filling the holes with a soil-cement material.

In this operation, steel bars for the deep piles 60 arranged at various locations in a single base 20 need not to have an identical length, and thus steel bars having a short length may be advantageously applied to relatively hard soil.

The sockets 50 are mounted on the upper ends of the deep piles 60 for the deep pile foundation, and the horizontal guide bars 70 are connected to side surfaces of the sockets 50, thereby completing a basic frame for the original ground below the base 20. The base 20 including the shallow piles 40 is disposed on the frame for the deep pile foundation located in the original ground, and then sockets 50 are fastened thereto, thereby installing the base 20. In this case, backfilling of the excavated ground is carefully performed by fully tramping a soil-cement material or a high quality sandy soil.

When the base 20 including such deep piles 60 is pre-manufactured and installed on site, or directly manufactured on site, the original ground is excavated to provide an excavated surface according to a general concept in FIG. 5 in order to permit normal base work. Accordingly, the present invention ensures excellent economic feasibility.

The housing 30 disposed on the base 20, on which the sensor 10 is placed, has a function of protecting the sensor 10 from external environmental conditions, such as weather conditions or animals and plants, so that surroundings of the sensor 10 may be kept in a normal, satisfactory state.

The housing 30 may have a size to permit proper maintenance of the sensor 10. If the housing is excessively large, there can be difficulty in transportation and installation of the housing and the housing becomes noticeable when placed on the base. Therefore, in order to obtain a suitable space, the housing 10 may have a tolerance of about 2 cm to 3 cm at each side into the area of the base in top view (e.g., the distance between the edge of the sensor 10 and the edge of the base closest to the edge of the sensor is 1 to 1.5 times the diameter of the sensor) (see FIGS. 4 and 5). Further, the housing 30 may have various regular shapes, such as a circular shape or a regular octagonal shape, in addition to a square shape like the base 20, in top view.

The height of the housing 30 is two times the height of the sensor 10 to enable effective maintenance and provide a general appearance. The housing 30 may be pre-manufactured to be integrated with the base 2. Alternatively, the base 20 may be pre-formed with a housing coupling groove 21 to act as a base-housing coupling portion, and the housing 30 is then fitted into the housing coupling groove 21 on site and subjected to sealing for integration and waterproofing. In order to check the sensor 10 or to replace or perform maintenance of the sensor 10, the housing 30 is provided at an upper end thereof with a lid 31 capable of being rotationally opened or closed. Further, a sealable flexible tube 32 is inserted into the housing 30 to a location corresponding to ⅓ of the height of the housing from the upper surface of the base to provide a passage for cables connecting the earthquake monitoring sensor to an earthquake recorder and a power supply.

Unlike a seismometer, an accelerometer is generally configured to secure the center of the sensor 10 to the base or the original ground, as shown in the drawings. In the base 20 for the accelerometer, a sensor anchor securing portion 22, which has a groove shape for installing an anchor, is pre-formed at a central region of the base to prevent a potential problem caused by additional drilling on site.

In addition, the anchor securing portion 22 may provide a function of ascertaining the center of the base, since the anchor securing portion 22 is formed at the center of the base 20 during a pre-manufacturing process. For the base 20 on which the seismometer as the sensor is installed, the anchor securing portion 22 may serve as a center point for indicating a location of the center.

The housing 30 is made of a material selected in terms of economic feasibility, environment, weight, and durability. Based on general considerations, a laminated composite structure filled with an insulation material and including aluminum surfaces is applied to a vertical wall. However, timber or organic materials may be employed in view of environmental friendliness rather than durability depending on field conditions or additional considerations.

In particular, the housing 30 has an outer wall formed with a large number of bumps or thorns to provide at least preparation against animals, irrespective of the material or structure thereof. When used to monitor an earthquake in energy-related facility sites, the housing 30 may have explosion-proof properties.

Figure 6:
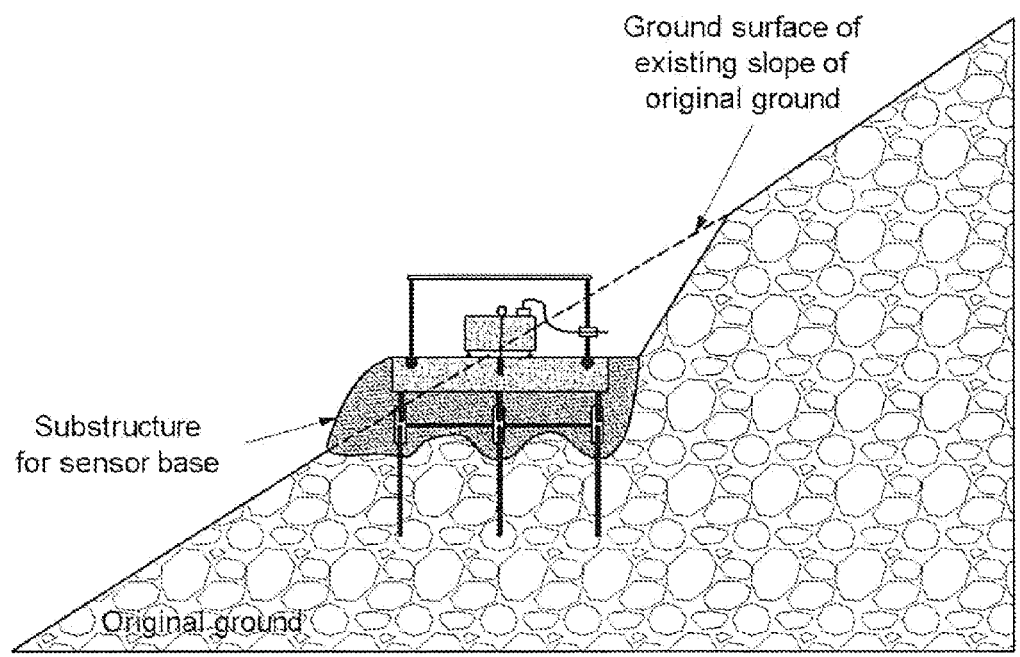
FIG. 6 is a view of an example of the earthquake monitoring device constructed on a slope according to the embodiment of the present invention.

When an earthquake is monitored on a sloped free-field, including, for example, natural slopes, slopes constructed by cutting or banking, and slopes on earth structures such as dams, unlike level or gently sloped ground, the gravity is not perpendicular to the ground surface. Therefore, in order to adequately monitor the earthquake on such a sloped free-field, methods of excavating the original ground and performing the backfilling operation during the sensor base work are different from those in the existing level free-field condition. In this case, as shown in FIG. 6, a point, at which a ground surface of an existing slope on original ground excavated intersects a bottom surface of the sensor (i.e., the upper surface of the base), becomes a monitoring target location. Therefore, when the same base and housing as those used in the level free-field condition are employed, a portion of the original ground which corresponds to an upper end of the existing slope is reconstructed to a stabilized slope instead of being subjected to backfilling.

Meanwhile, portions of the base 30 located outside and below the slope may be provided with a substructure formed of concrete or soil-cement material to extend outwards from the ground surface of the existing slope on the original ground in order to provide a stabilized support. For such a slope, the method of placing the base 40 including the shallow piles 40 or the deep piles 60, the sensor 10, and the housing 30 may be applied in the same manner as that in the level free-field condition. However, for earthquake monitoring on a slope of an embankment constituted of very large boulders or blasted rock, when the base 20 has a smaller area than a single boulder or blasted rock placed at a monitoring location in a top view, the area of the base 20 may be enlarged above the area of the single rock at the corresponding location.

As such, the earthquake monitoring device according to the present invention permits stable and efficient installation and operation on any ground surface under free-field conditions including level and sloped ground, and may provide precise monitoring results of earthquakes.

In particular, the earthquake monitoring device according to the present invention may provide reliable earthquake monitoring data by preventing mistakes in installation and operation of an earthquake monitoring sensor, thereby providing efficient earthquake alert and response and enabling efficient earthquake-resistant designs.

In addition, the earthquake monitoring device according to the present invention may have an environmentally friendly appearance to be directly exposed to natural environments and may be economically constructed. In particular, after being placed in such a manner, the earthquake monitoring device allows utilization of monitored data at the same location for several decades by replacing only an earthquake monitoring sensor, whereby continuous data obtained under the same conditions for a long time may be provided to experts in earthquake engineering.

Although some exemplary embodiments have been disclosed with reference to the accompanying drawings, it should be understood that these embodiments are provided for the purpose of illustration only and are not intended to limit the scope of the invention set forth in the accompanying claims. Therefore, it will be apparent to those skilled in the art that various modifications, changes, and alterations can be made without departing from the spirit and scope of the invention. The scope of the invention should be limited only by the accompanying claims and equivalents thereof.

What is claimed is:

1. An earthquake monitoring device, comprising:
    a sensor for sensing vibration;
    a base having an upper surface formed into a level surface, wherein the sensor is secured to the upper surface of the base and the base is placed on excavated ground such that the upper surface is positioned on a ground surface or the sensor on the upper surfaces intersects the ground surface;
    a plurality of shallow piles each having an upper portion inserted into and secured to a lower portion of the base and protruding from the lower portion of the base in a direction of gravity;
    a plurality of sockets each coupled to a lower portion of each of the shallow piles; and
    a plurality of deep piles each having an upper portion coupled to the socket and protruding from the lower portion of each of the shallow piles.

2. The earthquake monitoring device according to claim 1, further comprising:
    a plurality of guide bars coupled to side surfaces of the sockets to connect the sockets with each other in a lateral direction.

3. The earthquake monitoring device according to claim 1, further comprising:
    a housing placed on the upper portion of the base to accommodate the sensor therein.

4. The earthquake monitoring device according to claim 1, characterized in that the base has a thickness 1 to 2 times the thickness of the sensor, and a distance between an edge of the sensor and an edge of the base is 1 to 1.5 times the diameter of the sensor.

5. The earthquake monitoring device according to claim 1, characterized in that the base comprises one material selected from among concrete, reinforced concrete, soil-cement, timber, rubber, plastic, and rock.

6. The earthquake monitoring device according to claim 1, characterized in that the base has a bottom surface with high roughness.

7. The earthquake monitoring device according to claim 1, characterized in that the upper surface of the base is formed at a central region thereof with a sensor anchor securing portion having a groove shape to fix the sensor through an anchor.

8. The earthquake monitoring device according to claim 1, characterized in that the shallow piles are made of steel or aluminum.

9. The earthquake monitoring device according to claim 1, characterized in that the shallow piles have a length corresponding to a thickness of the base.

10. The earthquake monitoring device according to claim 3, characterized in that the housing is provided at an upper side thereof with a lid capable of being rotated open or closed, and at a side surface thereof with a flexible tube connecting cables.

11. A method of installing an earthquake monitoring device, comprising:
    excavating original ground;
    placing a base on the excavated ground such that an upper surface of the base is positioned on a ground surface or a sensor on the upper surface of the base intersects the ground surface;
    inserting shallow piles into, and securing to, a lower portion of the base to protrude from the lower portion of the base in a direction of gravity;
    installing the base by vertically positioning deep piles by penetrating the deep piles into the excavated ground in a push-in manner, coupling sockets on upper portions of the deep piles; coupling guide bars to side surfaces of the sockets to connect the sockets with each other; and coupling upper portions of the sockets to lower portions of the shallow piles;
    backfilling the excavated ground; and
    fixing a sensor for sensing vibration to a sensor location on the upper surface of the base.

12. The method according to claim 11, further comprising placing a housing on the upper portion of the base to accommodate the sensor before or after fixing the sensor.

* * * * *